United States Patent [19]

Stauffer

[11] 3,941,476
[45] Mar. 2, 1976

[54] FOCUS SYSTEM
[75] Inventor: Norman L. Stauffer, Engelwood, Colo.
[73] Assignee: Honeywell Inc., Minneapolis, Minn.
[22] Filed: Sept. 5, 1974
[21] Appl. No.: 503,451

[52] U.S. Cl. .................... 356/3; 350/147; 350/159; 350/175 DR; 354/195; 356/16
[51] Int. Cl.² ............................................ G01C 3/12
[58] Field of Search ........... 350/147, 153, 156, 159, 350/213, 175 DR; 354/195, 197–201; 356/3, 10, 16, 19

[56] References Cited
UNITED STATES PATENTS

| | | | |
|---|---|---|---|
| 2,390,652 | 12/1945 | Ives | 356/10 |
| 2,412,074 | 12/1946 | Benford | 350/159 UX |
| 3,520,592 | 7/1970 | Leib et al. | 350/159 X |

FOREIGN PATENTS OR APPLICATIONS

| | | | |
|---|---|---|---|
| 901,579 | 7/1945 | France | 356/114 |

Primary Examiner—Alfred E. Smith
Assistant Examiner—F. L. Evans
Attorney, Agent, or Firm—Arthur H. Swanson; Lockwood D. Burton; George E. Bodenstein

[57] ABSTRACT

A system for visually determining the distance to an object includes a lens that is adapted to be sighted upon an object, said lens being divided equally in a first direction with each half covered by polarizing masks arranged at right angles to each other, a flat light transmission analyzer positioned in the vicinity of the focal plane of the lens and dividing the field of view thereof in a second direction displaced 90° with respect to said first direction, each half of the analyzer being covered by polarizing elements arranged at right angles to each other, and calibrated means to indicate the relative position of adjustment of the lens and analyzer when the observed images at the opposite sides of the divided field of view are in coincidence.

4 Claims, 4 Drawing Figures

FOCUS SYSTEM

BACKGROUND OF THE INVENTION

1. Field Of The Invention

This invention relates to an improvement in an optical apparatus for visually determining the distance of an object.

2. Description Of The Prior Art

Many concepts and techniques have been proposed in the prior art for measuring the distance between an optical device and an object upon which it is sighted. In one form of such apparatus a pair of images of the object are respectively directed along different paths which establish a well-known range finder triangle having the object at its apex. The images of the object transmitted along the legs of the triangle are compared with each other. Thus, such a device includes a pair of optical systems for providing the pair of images. The image provided by one of the optical systems is adjusted manually with respect to the image provided by the other optical system until the images of both systems are in coincidence. The adjustment of said one of the images with respect to the other is indicated on a scale to provide a measure of the distance between the sighted object and the optical device. The accuracy of the measurement increases as the width of the base of the triangle is increased. This known structure thus is rather bulky and cumbersome. Also, separate optical systems are required for receiving the images that have traversed different paths from the object to the device.

The range finder of the present invention is characterized by its response to images of the object sighted upon as received along a single path, and accordingly, provides a desirable improvement in respect of its simplicity, bulk, and in the number of optical components required. This result is achieved by the utilization in a novel manner of an image splitting plane which allows independent viewing of the object through opposite halves of the objective lens and provides a divided viewing field having respectively associated viewing surfaces, hereinafter referred to as upper and lower viewing surfaces.

It is known in the prior art to provide image splitting means of this general type for indicating an out-of-focus condition of the object sighted upon. Such known optical devices, however, employ split image prisms which do not provide a true flat focal plane. As a consequence, in such prior apparatus irregularities can occur in the images produced at said upper and lower surfaces of the viewing field that make it difficult for the operator to determine when both images are precisely in coincidence.

SUMMARY OF THE INVENTION

An object of the present invention is to provide an improvement in a focus system of the split image type which facilitates determination of coincidence of the images.

A further object of the invention is to provide an optical focusing arrangement which is characterized by its simplicity and the use of a true flat focal plane.

In accomplishing these and other objects, there has been provided, in accordance with the present invention, an improved focus system in which the image of the object sighted upon is directed along a path to a single lens. The lens is divided equally in a first direction, for example, vertically and each half is covered by polarizing elements or masks arranged at right angles, respectively. Thus, one half of the lens is arranged to transmit light rotated 45° clockwise with respect to the vertical and the other half of the lens is arranged to transmit light rotated 45° counter clockwise with respect to the vertical. The viewing field at the focal plane of the lens also is divided in half but in a second direction that is displaced 90° with respect to the division of the lens, for example, horizontally. Again, each half of the division of the focal plane is covered by a separate flat polarizing element arranged and used as an analyzer. The focal plane is re-imaged or viewed through a second lens. With this arrangement, the typical split image effect similar to that obtained with the above mentioned prior art devices will be observed as the first mentioned lens is moved along its optical axis with respect to the focal plane. The vertical components of the image will be split at the interface of the analyzers and will appear to be continuous when the lens system is in best focus. An advantage of the focus device of the present invention is its simplicity and the use of a true flat focal plane.

BRIEF DESCRIPTION OF THE DRAWINGS

A better understanding of the present invention may be had from the following detailed description when read in connection with the accompanying drawings, wherein.

DETAILED DESCRIPTION OF THE EMBODIMENT

Figure 1:
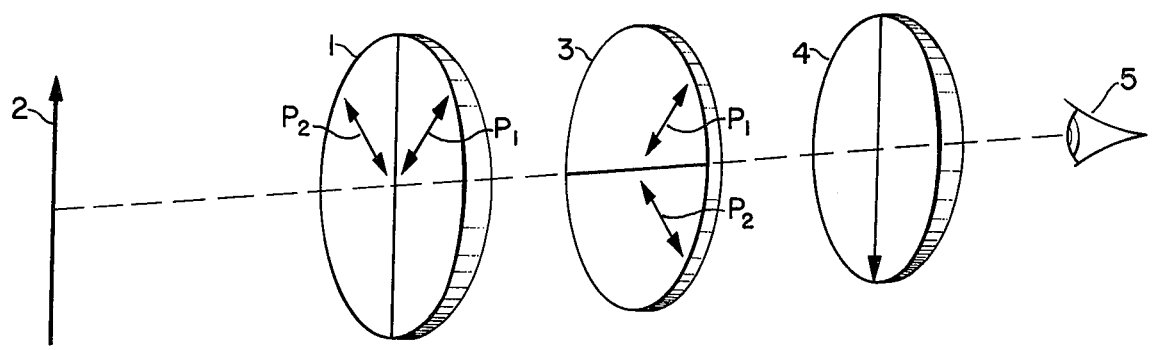
FIG. 1 is a perspective view illustrating the optical system of the present invention.
Figure 3:
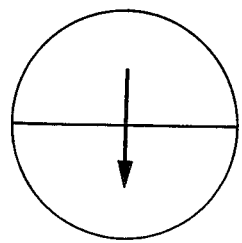
FIG. 3 illustrates the continuous image produced by the device of the present invention for an in-focus condition.
Figure 4:
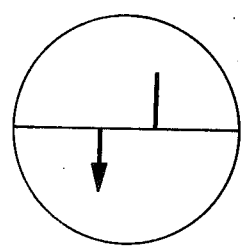
FIG. 4 illustrates the discontinuous image that is produced by the device of the present invention for an out-of-focus condition.

The perspective view of FIG. 1 of the drawings shows the interrelations of the various components of the focus device or visual range finder according to the present invention. More specifically, a lens 1 is arranged for sighting upon an object 2 located at a distance. The lens 1 is divided vertically as seen in FIG. 1, and each half is covered by polarizing elements respectively arranged at right angles to each other. A flat light transmitting analyzing member indicated at 3 is provided in the vicinity of the focal plane of the lens 1 to divide the viewing field of the latter in half. Member 3, as shown, is parallel to the focal plane. The division of the viewing field of the lens 1 provided by member 3 is in direction normal to the direction of the division of the lens 1, that is to say, horizontally, as seen in FIG. 1. Each half of the element 3 is covered by polarizing elements also arranged respectively at right angles to each other. A second lens indicated at 4 is provided for enabling an observer whose eye is indicated at 5 to view the object sighted upon. With this arrangement the observer will see a typical split image effect as the lens 1 is moved along its optical axis with respect to the focal plane. The vertical lined elements will be split at the interface and will appear to be continuous, as illustrated in FIG. 3 when the lens system is in best focus. When the lens system is in an out-of-focus condition, the vertical lined elements will appear to be discontinuous as illustrated in FIG. 4.

Figure 2:
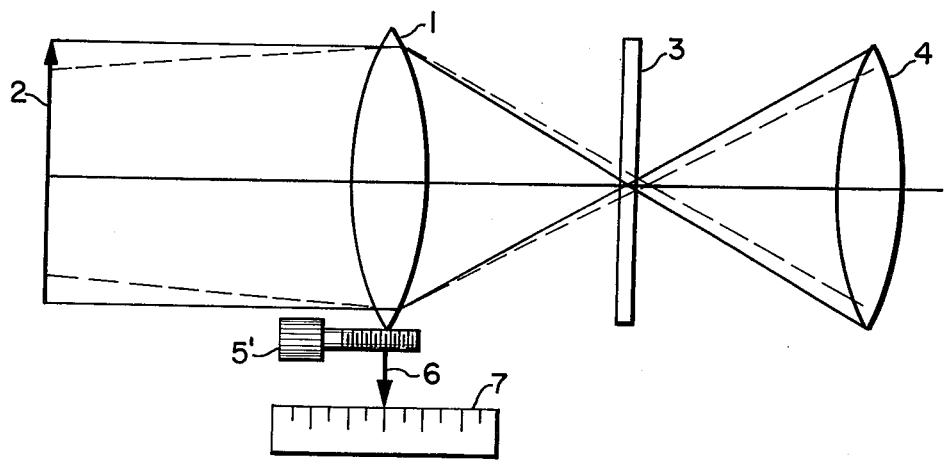
FIG. 2 is an optical diagram illustrating the paths of the light rays from the object sighted upon through the device of the present invention for both in-focus and out-of-focus conditions.

By reference to FIG. 2, it will be seen that the principal rays from one point on the object are shown as transmitted and focused by each half of the lens element. When the range finder is in proper focus, these principal rays, shown in full lines, intersect at the plane of the analyzers and will appear coincidental as viewed through lens 4. For an out-of-focus image, the principal rays, as shown in dotted lines, do not intersect at the plane of the analyzers, but will intersect either behind or in front of the plane and thus always appear displaced as they pass this plane. Thus, vertical lined elements will appear discontinuous when these rays do not intersect at the plane of the analyzers.

In further explanation of the foregoing, it is noted that the halves of lens 1 are polarized in first and second directions indicated as $P_1$ and $P_2$, respectively. The directions of $P_1$ and $P_2$ are displaced 90° from one another and each is displaced 45° with respect to the vertical dividing line, as seen in FIG. 1. To this end suitable polarizing materials or masks may be placed or coated on the surface of the opposite halves of the lens.

The flat analyzer mask element 3 consists of an upper portion which is polarized in the first direction $P_1$ and a lower portion which is polarized in the second direction $P_2$. Thus, with respect to incident light from lens 1, the upper portion of element 3 transmits only light polarized in the first direction $P_1$ and the lower portion transmits only light polarized in the second direction $P_2$. As a result only light transmitted by the upper right and lower left quadrants of lens 1, as seen in FIG. 1, is transmitted by analyzer 3 to the lens 4. Thus, the field of view as seen through lens 4 will appear to be divided by a horizontal line above which is the image of object 2 from the upper right quadrant of lens 1, and below which is the image of object 2 from the lower left quadrant of lens 1. When the image of the object 2 is at the focal plane of the lens 1, coincident with the plane of analyzer 3, the image of object 2 above the horizontal line will coincide with the image below the horizontal line and the image thus will be continuous. When the image of the object 2 is not at the focal plane of lens 1 and is either in front of or back of the said focal plane, the image of object 2 above the horizontal line will not coincide with the said image below the horizontal line, and as a result, the image will be discontinuous.

In accordance with the invention, the lens 1 is arranged for linear manual adjustment in position along its optical axis by suitable means not shown, but including a knob 5'. Associated with the lens is an indicating member shown at 6 which is disposed to move along a scale 7. The scale 7 is suitably calibrated in terms of distance, in English or Metric units, as desired, whereby adjustment of the lens 1 to the position at which a continuous image of the object 2 is visually seen through lens 4 provides a direct measurement of the distance to the object 2. As those skilled in the art will understand, the lens 1 may be held stationary and the relative position of the analyzer 3 and the lens 1 may be made manually adjustable along the optical axis of the lens. Indicating member 6 and a suitable scale 7 may then be provided in association with analyzer 3 to provide the measurement of the distance to the object 2.

Thus, there has been provided in accordance with the present invention an improved optical device for focusing an image and for measuring the distance to an object which is characterized by its simplicity and the use of a true flat focal plane.

The embodiments of the invention in which an exclusive property or privilege is claimed are defined as follows:

1. An optical system comprising a vertically divided lens each half of which is covered by polarizing elements arranged at right angles with respect to each other, an analyzer having polarizing elements arranged at right angles with respect to each other and disposed in the viewing field of said lens in the vicinity of and substantially parallel to the focal plane thereof and arranged to divide said viewing field in half in a direction normal to the division of said lens, and means to reimage said focal plane.

2. An optical focus system comprising a lens adapted to be sighted upon an object, said lens being divided equally in a first direction and each half thereof covered by polarizing elements arranged at right angles to each other, a flat light transmission analyzer at the vicinity of the focal plane of said lens dividing the field of view of said lens in a second direction displaced substantially 90° with respect to said first direction, each half of said analyzer being covered by polarizing elements arranged at right angles to each other, means to permit relative movement of said lens and said analyzer along the optical axis of said lens, and means to observe said field of view.

3. A combination as specified in claim 2 including manually adjustable means for relatively adjusting said lens and said analyzer in position along said optical axis of said lens and including distance calibration means to indicate the said relative position of adjustment when the observed images at the opposite sides of said divided field of view are in coincidence.

4. A combination as specified in claim 2 including manually adjustable means for adjusting said lens in position along its optical axis and including distance calibration means to indicate the position of adjustment of said lens when the observed images at the opposite sides of said divided field of view are in coincidence.

* * * * *